United States Patent
Mills et al.

(10) Patent No.: US 11,267,465 B1
(45) Date of Patent: Mar. 8, 2022

(54) ENHANCED THREAT ASSESSMENT

(71) Applicant: Ford Global Technologies, LLC, Dearborn, MI (US)

(72) Inventors: Aaron L. Mills, Ann Arbor, MI (US); Rebecca Lynne Seiler, Northville, MI (US); Alex Maurice Miller, Canton, MI (US); Gopichandra Surnilla, West Bloomfield, MI (US); Alekhya Ratnala, Novi, MI (US); Hao Zhang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 373 days.

(21) Appl. No.: 16/560,786

(22) Filed: Sep. 4, 2019

(51) Int. Cl.
*B60W 30/095* (2012.01)
*B60W 30/09* (2012.01)
*G08G 1/16* (2006.01)
*G08G 5/02* (2006.01)
*B60W 30/08* (2012.01)

(52) U.S. Cl.
CPC ........ *B60W 30/0956* (2013.01); *B60W 30/09* (2013.01); *G08G 1/166* (2013.01); *G08G 5/025* (2013.01); *B60W 30/08* (2013.01); *G08G 1/161* (2013.01)

(58) Field of Classification Search
CPC .. B60W 30/0956; B60W 30/90; B60W 30/08; B60W 30/18154; B60W 30/18159; G08G 1/166; G08G 5/025; G08G 1/161
See application file for complete search history.

(56) References Cited

U.S. PATENT DOCUMENTS

| | | | |
|---|---|---|---|
| 7,592,945 B2 | 9/2009 | Colburn et al. | |
| 7,994,902 B2 | 8/2011 | Avery et al. | |
| 8,370,056 B2 | 2/2013 | Trombley et al. | |
| 10,239,452 B1 | 3/2019 | Szczepaniak et al. | |
| 2011/0010023 A1* | 1/2011 | Kunzig | G05D 1/0234 701/2 |

(Continued)

OTHER PUBLICATIONS

International Search Report and Written Opinion for PCT Application No. PCT/US2020/049161 dated Dec. 3, 2020.

(Continued)

*Primary Examiner* — Abby Y Lin
*Assistant Examiner* — Dylan M Katz
(74) *Attorney, Agent, or Firm* — Frank MacKenzie; Bejin Bieneman PLC

(57) ABSTRACT

A computer includes a processor and a memory, the memory storing instructions executable by the processor to, in a host vehicle, determine a threat number for a first target vehicle based on data received from the first target vehicle indicating at least one of a position, speed, or route history of the first target vehicle, identify a second target vehicle based on data collected with one or more host vehicle sensors when the threat number of the first target vehicle exceeds a threshold, determine that the first target vehicle and the second target vehicle are not a same vehicle, and, then, upon determining that the first target vehicle and the second target vehicle are not the same vehicle and that at least one of (a) a barrier is detected between the host vehicle and the first target vehicle or (b) that a threat number of the second target vehicle exceeds a second threshold, suppress a collision avoidance action.

20 Claims, 7 Drawing Sheets

(56) References Cited

U.S. PATENT DOCUMENTS

| | | |
|---|---|---|
| 2013/0278442 A1 | 10/2013 | Rubin et al. |
| 2014/0347475 A1 | 11/2014 | Divakaran et al. |
| 2015/0175616 A1 | 6/2015 | Breed |
| 2017/0010174 A1* | 1/2017 | Melen .................. G01C 5/06 |
| 2017/0031019 A1 | 2/2017 | Mandava et al. |
| 2019/0164430 A1* | 5/2019 | Nix ..................... B60R 11/04 |

OTHER PUBLICATIONS

Wei Liu, et al., "Occluded Street Objects Perception Algorithm of Intelligent Vehicles Based on 3D Projection Model", published Jun. 14, 2018, Journal of Advanced Transportation, vol. 2018, Article ID 1547276, retrieved from Internet URL: https://doi.org/10.1155/2018/1547276 (8 pages).

* cited by examiner

ENHANCED THREAT ASSESSMENT

BACKGROUND

Vehicle collisions often occur at intersections of roadways. A vehicle can detect a target vehicle at the intersection. Collision mitigation between the vehicle and the target vehicle may be difficult and expensive to implement. For example, determining a threat assessment on the target vehicle can require data from a plurality of sensors.

DETAILED DESCRIPTION

Figure 1:
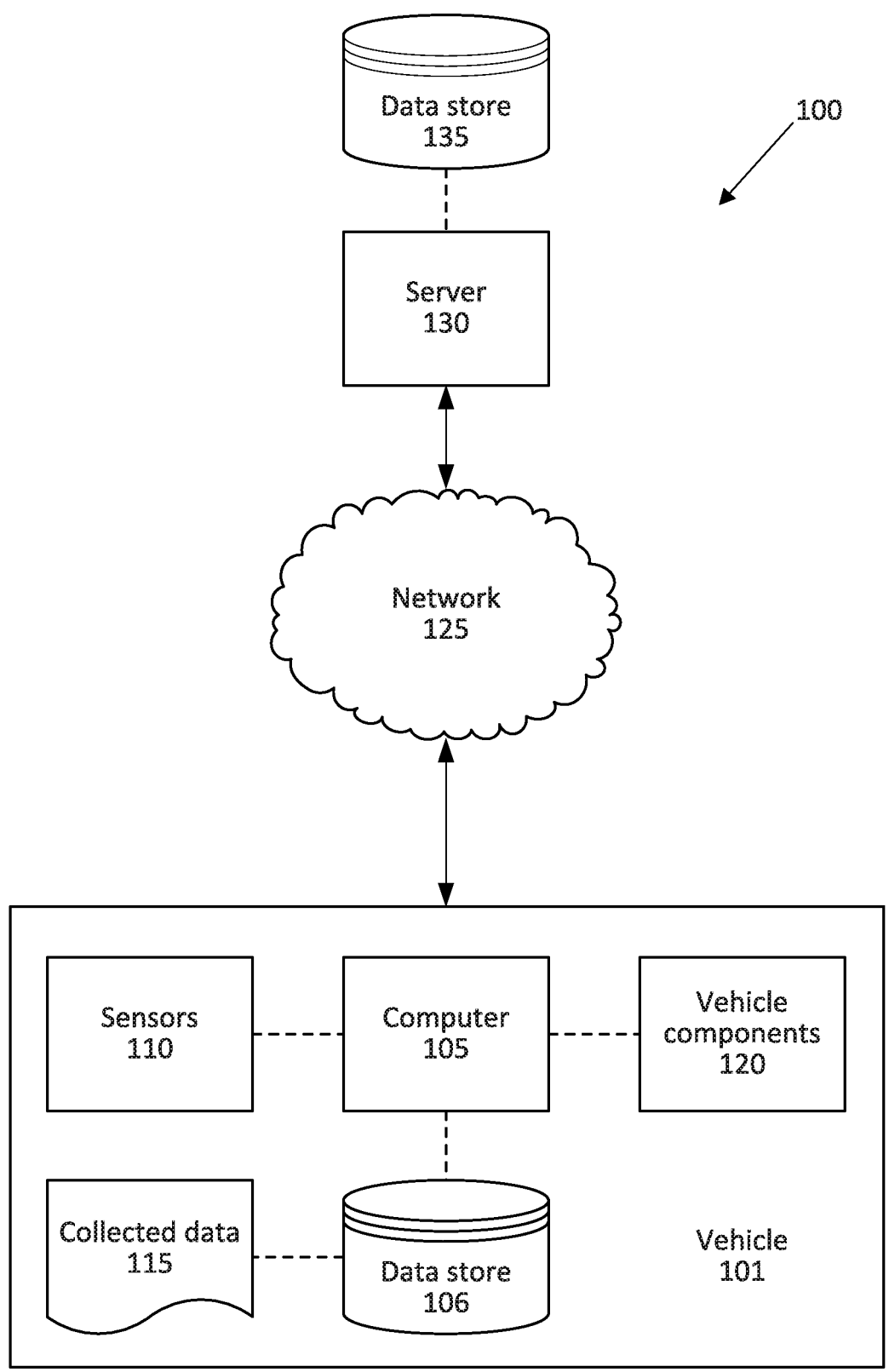
FIG. 1 is a block diagram of an example system for collision avoidance and mitigation.

A computer includes a processor and a memory, the memory storing instructions executable by the processor to, in a host vehicle, determine a threat number for a first target vehicle based on data received from the first target vehicle indicating at least one of a position, speed, or route history of the first target vehicle, identify a second target vehicle based on data collected with one or more host vehicle sensors when the threat number of the first target vehicle exceeds a threshold, determine that the first target vehicle and the second target vehicle are not a same vehicle, and, then, upon determining that the first target vehicle and the second target vehicle are not the same vehicle and that at least one of (a) a barrier is detected between the host vehicle and the first target vehicle or (b) that a threat number of the second target vehicle exceeds a second threshold, suppress a collision avoidance action.

The instructions can further include instructions to determine that the first target vehicle and the second target vehicle are not the same vehicle when data from the sensors indicating at least one of a size, position, and speed differs from corresponding received data by a threshold.

The instructions can further include instructions to suppress the collision avoidance action upon determining that a difference between a vertical position of the first target vehicle and a vertical position of the host vehicle exceeds a threshold.

The instructions can further include instructions to suppress the collision avoidance action upon determining that the first target vehicle is on a bridge above the host vehicle.

The instructions can further include instructions to allow the collision avoidance action upon failing to detect the second target vehicle with the vehicle sensors.

The instructions can further include instructions to allow the collision avoidance action upon determining that the threat number of the second target vehicle is below a second threshold.

The instructions can further include instructions to arbitrate the collision avoidance action and a second collision avoidance action, the second collision avoidance action directed toward the second target vehicle, based on a receipt order of the received data from the first target vehicle and the sensor data identifying the second target vehicle.

The instructions can further include instructions to suppress the collision avoidance action upon identifying that the first target vehicle and the second target vehicle are the same vehicle and detecting no occluding object between host vehicle and the first target vehicle.

The instructions can further include instructions to allow the collision avoidance action upon identifying an occluding object between the host vehicle and the first target vehicle.

The instructions can further include instructions to suppress the collision avoidance action upon determining that the second target vehicle is closer to the host vehicle than the first target vehicle.

A method includes determining a threat number for a first target vehicle based on data received from the first target vehicle indicating at least one of a position, speed, or route history of the first target vehicle, identifying a second target vehicle based on data collected with one or more host vehicle sensors when the threat number of the first target vehicle exceeds a threshold, determining that the first target vehicle and the second target vehicle are not a same vehicle, and, then, upon determining that the first target vehicle and the second target vehicle are not the same vehicle and that at least one of (a) a barrier is detected between a host vehicle and the first target vehicle or (b) that a threat number of the second target vehicle exceeds a second threshold, suppressing a collision avoidance action.

The method can further include determining that the first target vehicle and the second target vehicle are not the same vehicle when data from the sensors indicating at least one of a size, position, and speed differs from corresponding received data by a threshold.

The method can further include suppressing the collision avoidance action upon determining that a difference between a vertical position of the first target vehicle and a vertical position of the host vehicle exceeds a threshold.

The method can further include suppressing the collision avoidance action upon determining that the first target vehicle is on a bridge above the host vehicle.

The method can further include allowing the collision avoidance action upon failing to detect the second target vehicle with the vehicle sensors.

The method can further include allowing the collision avoidance action upon determining that the threat number of the second target vehicle is below a second threshold.

The method can further include arbitrating the collision avoidance action and a second collision avoidance action, the second collision avoidance action directed toward the second target vehicle, based on a receipt order of the received data from the first target vehicle and the sensor data identifying the second target vehicle.

The method can further include suppressing the collision avoidance action upon identifying that the first target vehicle and the second target vehicle are the same vehicle and detecting no occluding object between host vehicle and the first target vehicle.

The method can further include allowing the collision avoidance action upon identifying an occluding object between the host vehicle and the first target vehicle.

The method can further include suppressing the collision avoidance action upon determining that the second target vehicle is closer to the host vehicle than the first target vehicle.

A system includes a host vehicle sensor, means for determining a threat number for a first target vehicle based on data received from the first target vehicle indicating at least one of a position, speed, or route history of the first target vehicle, means for identifying a second target vehicle based on data collected with the host vehicle sensor when the threat number of the first target vehicle exceeds a threshold, means for determining that the first target vehicle and the second target vehicle are not a same vehicle, and means for suppressing a collision avoidance action upon determining that the first target vehicle and the second target vehicle are not the same vehicle and that at least one of (a) a barrier is detected between a host vehicle and the first target vehicle or (b) that a threat number of the second target vehicle exceeds a second threshold.

The system can further include means for determining that the first target vehicle and the second target vehicle are not the same vehicle when data from the sensors indicating at least one of a size, position, and speed differs from corresponding received data by a threshold.

The system can further include means for allowing the collision avoidance action upon determining that the threat number of the second target vehicle is below the second threshold.

The system can further include means for arbitrating the collision avoidance action and a second collision avoidance action, the second collision avoidance action directed toward the second target vehicle, based on a receipt order of the received data from the first target vehicle and the sensor data identifying the second target vehicle.

The system can further include means for suppressing the collision avoidance action upon identifying that the first target vehicle and the second target vehicle are the same vehicle and detecting no occluding object between host vehicle and the first target vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Upon detecting target vehicles, a host vehicle can generate collision avoidance actions to avoid and/or mitigate a collision with one or more of the target vehicles. However, not all target vehicles may warrant collision avoidance. For example, the target vehicle may be separated from the host vehicle by a concrete barrier, and the target vehicle may thus not be likely to collide with the host vehicle. By suppressing collision avoidance actions for target vehicles not likely to collide with the host vehicle, the computer can reduce a number of nuisance actions. Furthermore, the system can differentiate between target vehicles that can allow a human operator to react, during which a collision avoidance warning can be suppressed, and potential collisions with target vehicles not visible to the human operator, during which the computer can perform the collision avoidance action to avoid and/or mitigate a potential collision.

FIG. 1 illustrates an example system 100 for collision avoidance and mitigation. Unless indicated otherwise in this disclosure, an "intersection" is defined as a location where two or more vehicles' respective current or potential future trajectories cross. Thus, an intersection could be at any location on a surface where two or more vehicles could collide, e.g. a road, a driveway, a parking lot, an entrance to a public road, driving paths, etc. Accordingly, an intersection is determined by identifying a location where two or more vehicles may meet, i.e., collide. Such determination uses potential future trajectories of a host vehicle 101 as well as nearby other vehicles and/or other objects.

A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
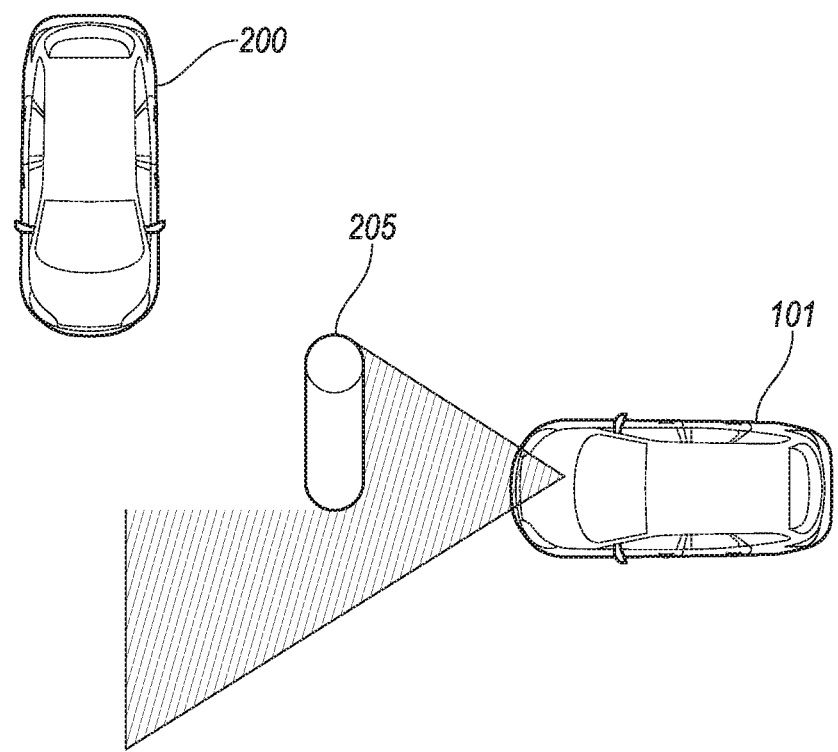
FIG. 2 is a plan view of a host vehicle and an object occluding a target vehicle.

FIG. 2 is a plan view of an example host vehicle 101 and an example target vehicle 200. The target vehicle 200 can transmit a message over the network 125 (e.g., via V2V communications) to the host vehicle 101. The message can include data 115 about the target vehicle 200, e.g., a speed, a position, an elevation, a trajectory, a route history, etc. The computer 105 can, upon receiving the message, actuate one or more sensors to detect the target vehicle 200, as described below. When the computer 105 detects the target vehicle 200 with sensor data 115 that substantially matches the data 115 in the message, the computer 105 can determine that the detected target vehicle 200 is the same vehicle as the target vehicle 200 that sent the message, as described below.

The computer 105 can determine a threat number TN for the target vehicle 200 based on the data 115 in the message. A threat number is a prediction of whether a specific target 200 will intersect or collide with the host vehicle 101. Specifically, the computer 105 may determine an acceleration threat number ATN, a brake threat number BTN, and a steering threat number STN for the host vehicle 101 and the target 200, and based on the threat numbers ATN, BTN, STN, which may be combined into a single threat number TN, to actuate components 120.

The BTN is a measure of a needed longitudinal deceleration to allow the host vehicle 101 to stop before colliding with the target 200. The BTN can be based on a measured host vehicle 101 speed, a distance between the target 200 and the host vehicle 101, and the projected paths 210$h$, 210$a$.

The computer 105 can determine a longitudinal deceleration to stop the host vehicle 101 before colliding with the target 200, e.g., 2 m/s$^2$. The computer 105 can determine a maximum deceleration of the host vehicle 101, e.g., 8 m/s$^2$. The BTN can be the ratio of the needed deceleration to the maximum deceleration, e.g., BTN=2/8=0.25. If the needed deceleration to avoid a collision with the target 200 exceeds the maximum deceleration of the host vehicle 101, i.e., BTN>1, then the computer 105 can set the value of the BTN to 1, i.e., if BTN>1, BTN=1.

The STN is a measure of a needed lateral acceleration to allow the host vehicle 101 to steer away from the target 200. As with the BTN, the computer 105 can determine a needed lateral acceleration to avoid a collision between the host vehicle 101 and the target 200. The STN can be the ratio of the needed lateral acceleration to a maximum lateral acceleration of the host vehicle 101. If the needed lateral acceleration exceeds the maximum lateral acceleration, the computer 105 can set the STN to 1.

The ATN is a measure of a needed longitudinal acceleration to allow the host vehicle 101 to accelerate and pass the target 200. As described above for the BTN and the STN, the computer 105 can determine a needed acceleration to allow the host vehicle 101 to pass the target 200 and a maximum available acceleration of the host vehicle 101. The ATN can be the ratio of the needed longitudinal acceleration to the maximum longitudinal acceleration of the host vehicle 101. If the needed longitudinal acceleration exceeds a maximum longitudinal acceleration, the computer 105 can set the ATN to 1. The computer 105 may determine the STN, BTN, and/or ATN to produce a respective threat number TN for each target 200.

The computer 105 can determine the threat number TN based on the predicted trajectories of the host vehicle 101 and the target 200. That is, based on the position, velocity, acceleration, and turn rate of the host vehicle 101 and the target 200, the computer 105 can determine the threat number TN for the target 200. In one non-limiting example, the threat number can be a ratio of a required deceleration to stop the target 200 prior to entering the host vehicle path 210$h$ (i.e., a "zero-range" deceleration) to a predetermined maximum deceleration of the target 200.

The computer 105 can actuate one or more vehicle components 120 based on the threat number TN, e.g., when the threat number TN is above a predetermined threat number threshold. The computer 105 can actuate one or more components 120 based on a comparison of the threat number to a plurality of thresholds. The thresholds can be determined as, e.g., specifications from a manufacturer, results of simulation testing of virtual host vehicle and virtual target vehicle trajectories, empirical testing of vehicle components 120 during a collision test, etc. For example, if the threat number TN is above 0.7, the computer 105 can actuate a brake 120 to decelerate the host vehicle 101, e.g., at −6.5 meters per second squared (m/s$^2$). In another example, if the threat number TN is above 0.4 but less than or equal to 0.7, the computer 105 can actuate the brake 120 to, e.g., a deceleration of −2.0 m/s$^2$. In another example, if the threat number TN is greater than 0.2 but less than or equal to 0.4, the computer 105 can display a visual warning on a host vehicle 101 human-machine interface and/or play an audio warning over a speaker.

The computer 105 can perform a collision avoidance action based on the threat number. In this context, a "collision avoidance action" is an action including actuation of one or more components 120 to avoid and/or mitigate a collision with the target vehicle 200. The collision avoidance action can include, e.g., providing a forward collision warning on a display screen in an interior of the vehicle 101, actuating a brake 120 to stop the host vehicle 101, actuating a propulsion 120 to avoid the target vehicle 200, actuating a steering component 120 to avoid the target vehicle 200, etc. The computer 105 can suppress the collision avoidance action upon determining that the target vehicle 200 is not likely to collide with the vehicle 101, i.e., the likelihood of the target vehicle 200 to collide with the host vehicle 101 would not require collision mitigation or avoidance. In this context, to "suppress" a collision avoidance action is to prevent one or more components 120 from performing the collision avoidance action. For example, the computer 105 can prevent a human-machine interface (HMI) such as a display from displaying a warning indicating a forward collision. In another example, the computer 105 can prevent a steering motor from receiving an instruction to steer away from the target vehicle 200.

In the example of FIG. 2, the target vehicle 200 is occluded from the host vehicle 101. The intersection can include an object 205 that can prevent sensors 110 in the host vehicle 101 from detecting the target vehicle 200. For example, the object 205 can be a building, a utility pillar, etc. As used herein, the target vehicle 200 is "occluded" when the sensors 110 in the host vehicle 101 do not detect the target vehicle 200 and the computer 105 of the host vehicle 101 receives the message from the target vehicle 200. That is, the computer 105 has received in the message data stating the existence of the target vehicle 200 but does not detect the target vehicle 200 with the sensors 110. The object 205 can block the sensors 110 from collecting data 115, e.g., blocking a field of vision of an image sensor 110, reflecting ultrasonic waves and/or radar waves, blocking lasers of a LIDAR 110, etc. When the computer 105 determines that the target vehicle 200 is occluded, the computer 105 can perform the collision avoidance action. When the computer 105 determines that the target vehicle 200 is not occluded, i.e., when the computer 105 identifies the target vehicle 200 with data 115 from the sensors 110 and data 115 from the message, the computer 105 can determine to suppress the collision avoidance action. That is, when the target vehicle 200 is not occluded, an operator of the host vehicle 101 can perform collision avoidance, and the computer 105 can determine to suppress the collision avoidance action to allow the operator to avoid the target vehicle 200. Alternatively, the computer 105 can determine to allow the collision avoidance action based on data 115 collected from the sensors 110 when the target vehicle 200 is not occluded.

Figure 3:
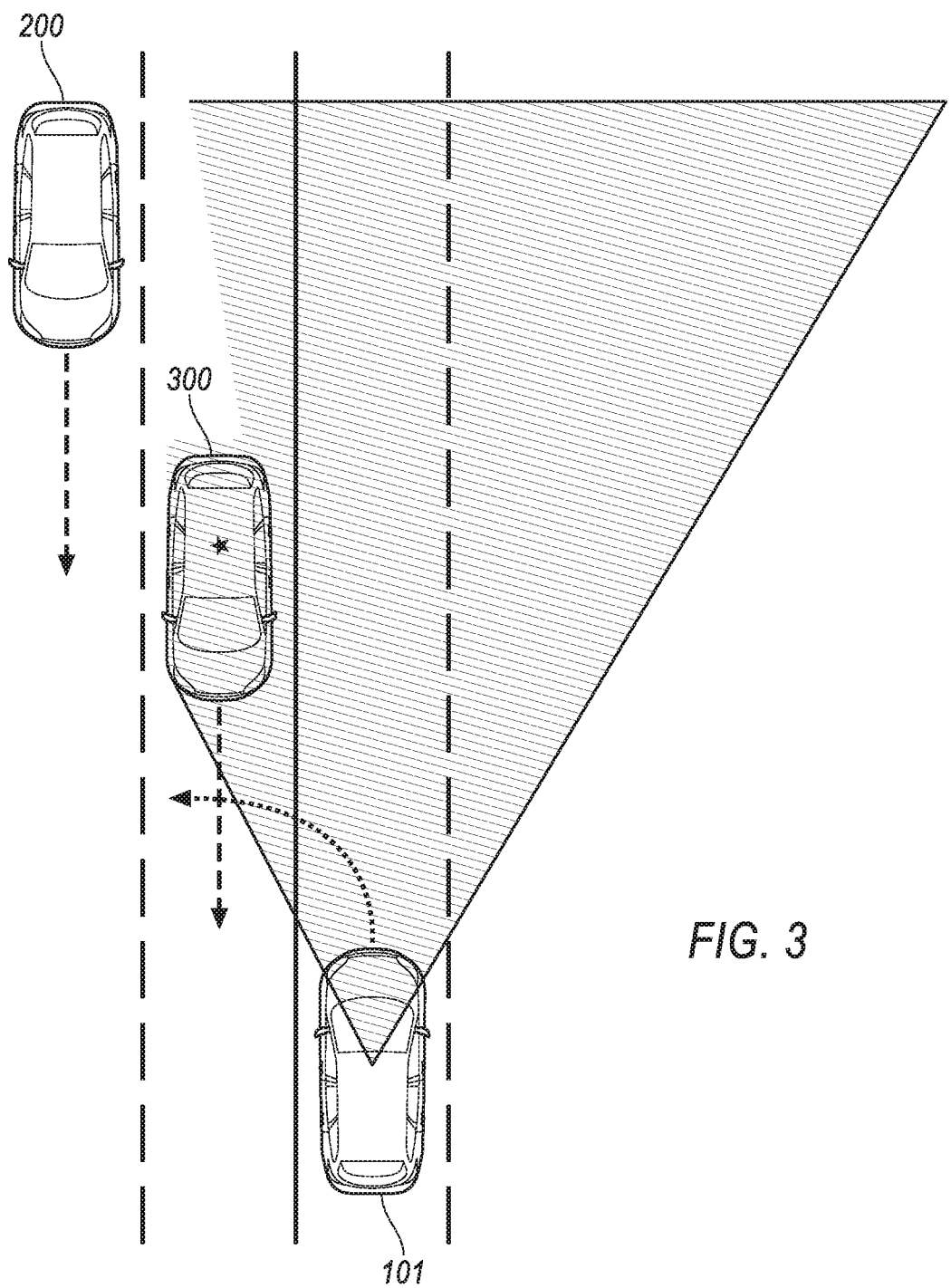
FIG. 3 is a plan view of the host vehicle, the target vehicle, and a second target vehicle.

FIG. 3 is a plan view of the host vehicle 101, the target vehicle 200, and a second target vehicle 300. The computer 105 can receive the message from the target vehicle 200, as described above. The second target vehicle 300 may not send a message to the computer 105. Thus, the computer 105 may receive a message from a target vehicle 200 and detect one or more target vehicles 200, 300 with data 115 from one or more sensors 110. That is, the computer 105 may not immediately recognize which target vehicle 200, 300 sent the message.

The computer 105 can collect data 115 about the second target vehicle 300 with one or more sensors 110. Because the second target vehicle 300 is at a closer distance to the host vehicle than the first target vehicle 200, the second target vehicle 300 is more likely to collide with the host vehicle 101 than the first target vehicle 200. Thus, the computer 105 can collect data 115 about the second target vehicle 300 before collecting data 115 about the first target vehicle 200.

The computer 105 can determine whether the first target vehicle 200 and the second target vehicle 300 are a same vehicle. The computer 105 can compare the data 115 from the message, which the computer 105 identifies as being received from the first target vehicle 200, to the data 115 collected by the sensors 110, which the computer 105 identifies as collected from the second target vehicle 300. If the data 115 received from the first target vehicle 200 substantially match the data 115 collected about the second target vehicle 300, the computer 105 can determine that the first target vehicle 200 and the second target vehicle 300 are the same vehicle. For example, from data 115, the computer 105 can determine whether the speed of the first target vehicle 200 is within a speed threshold of the speed of the second target vehicle 300, e.g., 3 miles per hour. If the speeds (i.e., a difference between them) are within the speed threshold, the computer 105 can determine that the first target vehicle 200 and the second target vehicle 300 are the same vehicle.

In another example, the computer 105 can compare a difference of positions of the first target vehicle 200 and the second target vehicle 300, from position data 115, to a position threshold, e.g., 2 square meters, and if the positions are within the position threshold, the computer 105 can determine that the first target vehicle 200 and the second target vehicle 300 are the same vehicle.

In yet another example, the computer 105 can compare route history data 115 of the first target vehicle 200 and route history data 115 of the second target vehicle 300 to determine if a difference of routes is within a route threshold, e.g., the routes are within 2 meters over the previous 50 meters. If the routes are within the route threshold, the computer 105 can determine that the first target vehicle 200 and the second target vehicle 300 are a same vehicle. In this context, "route history" data are travel path data indicating paths of travel of the target vehicles 200, 300. In yet another example, the computer 105 can use a combination of the data 115, e.g., the speed data 115, the position data 115, and/or the route history data 115, to determine whether the first target vehicle 200 and the second target vehicle 300 are the same vehicle.

In yet another example, the computer 105 can compare a difference in sizes, based on data 115, of the first target vehicle 200 and the second target vehicle 300 to a size threshold, e.g., 20 cm. That is, a vehicle "size" is a set of dimensions, such as can be determined from sensor 110 data 115, indicating a length, a width, and a height of the vehicle. If each of the length, the width, and the height of the first target vehicle 200 are within the size threshold of the length, the width, and the height of the second target vehicle 300, the computer 105 can determine that the first target vehicle 200 and the second target vehicle 300 are the same vehicle. If any one of the length, the width, or the height of the first target vehicle 200 differs from the respective length, the width, or the height of the second target vehicle 300, the computer 105 can determine that the first target vehicle 200 and the second target vehicle 300 are not the same vehicle.

If the first target vehicle 200 and the second target vehicle 300 are not a same vehicle, the computer 105 can determine the threat number for the second target vehicle 300. As described above, the computer 105 can determine the threat number TN as one of a brake threat number BTN, a steering threat number STN, or an acceleration threat number ATN. The computer 105 can determine the threat number TN with a threat number algorithm as described above. If the threat number of the second target vehicle 300 is above the threat number threshold described above, the computer 105 can determine that the second target vehicle 300 is a greater threat than the first target vehicle 200 and the computer 105 can suppress the collision avoidance action associated with the first target vehicle 200. That is, the computer 105 focuses on the second target vehicle 300 instead of the first target vehicle 200 and/or allows the operator to perform collision avoidance for the second target vehicle 300. Alternatively, if the threat number of the second target vehicle 300 is below the threat number threshold, the computer 105 can allow the collision avoidance action for the first target vehicle 200. Yet further alternatively, the computer 105 can compare the threat number of the second target vehicle 300 to a second threat number threshold that is different than the threat number threshold. Because the second target vehicle 300 may be at a closer distance to the host vehicle 101 than the first target vehicle 200, an operator of the host vehicle 101 may see the second target vehicle 300 and perform collision mitigation and avoidance for the second target vehicle 300 than for the first target vehicle 200. Thus, the second threat number threshold can be greater than the threat number threshold to account for the operator's awareness of the second target vehicle 300.

Figure 4:
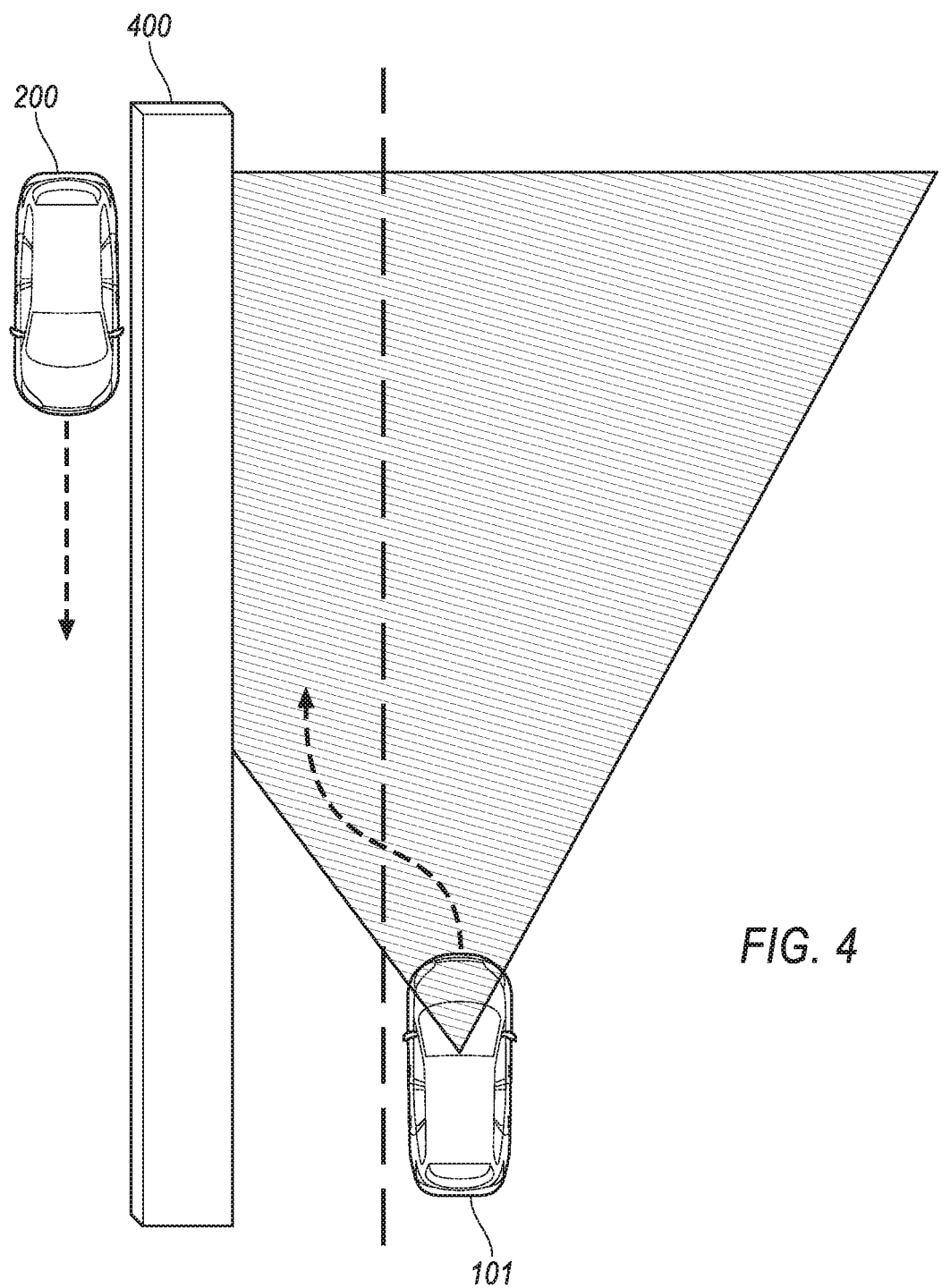
FIG. 4 is a plan view of a barrier between the host vehicle and the target vehicle.

FIG. 4 is a plan view of a barrier 400 between the host vehicle 101 and the target vehicle 200. The barrier 400 can be a structure that separates a roadway lane from another roadway lane to prevent vehicles from crossing between the roadway lanes. For example, the barrier 400 can be a concrete wall separating two roadway lanes. When there is a barrier 400 between the host vehicle 101 and the target vehicle 200, the target vehicle 200 is typically unable to cross through the barrier 400 and collide with the host vehicle 101, and the computer 105 can suppress a collision avoidance action for the target vehicle 200.

Upon determining that the threat number of the target vehicle 200 is above the threat number threshold, the computer 105 can collect data 115 with one or more sensors 110 to determine whether there is a barrier 400 between the host vehicle 101 and the target vehicle 200. The computer 105 can actuate a camera 110 to collect image data 115 of objects near the host vehicle 101. The computer 105 can apply a conventional image detection technique, e.g., Canny edge detection, to identify the barrier 400 between the host vehicle 101 and the target vehicle 200. In another example, the computer 105 can refer to a high-resolution geo-coordinate (e.g., GPS) map, that can include stored features such as barriers 400.

Figure 5:
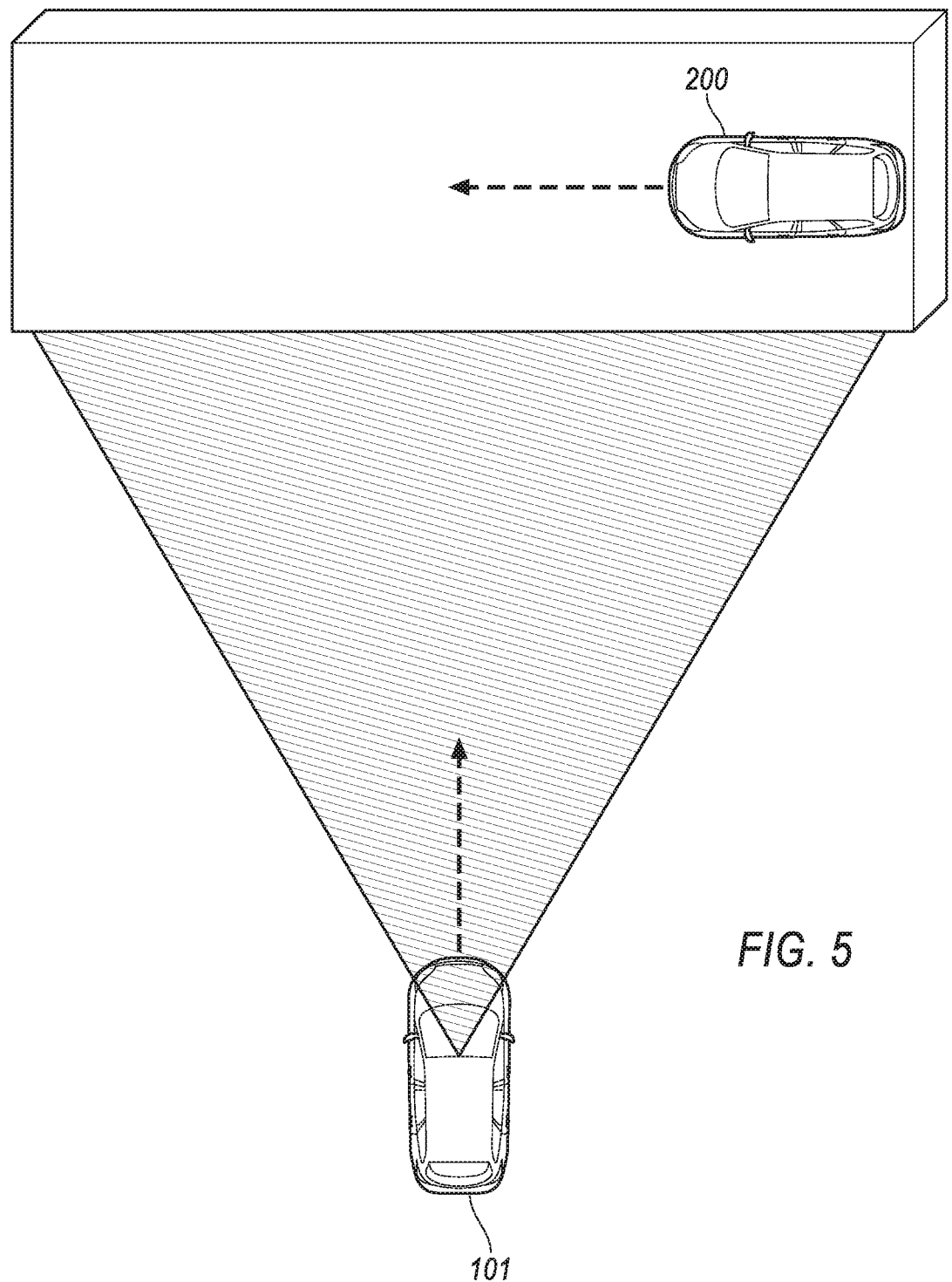
FIG. 5 is a plan view of the target vehicle at a different elevation than the host vehicle.

FIG. 5 is a plan view of the target vehicle 200 at a different elevation than the host vehicle 101. In this context, the "elevation" of the target vehicle 200 is the vertical distance of the target vehicle 200 relative to the host vehicle 101. When the target vehicle 200 is at a different elevation than the host vehicle 101, the target vehicle 200 is not likely to collide with the host vehicle 101, and the computer 105 can suppress a collision avoidance action for the target vehicle 200. For example, if the target vehicle 200 is on an overpass that extends over a roadway on which the host vehicle 101 is traveling, the target vehicle 200 is at a different elevation than the host vehicle 101 and is not likely to collide with the host vehicle 101.

The host vehicle 101 can determine the elevation of the target vehicle 200. For example, the host vehicle 101 can actuate a camera 110 to collect image data 115 of the target vehicle 200 and, using a conventional distance determining technique, identify a vertical distance of the target vehicle 200 relative to the host vehicle 101. If the identified vertical distance is above a threshold, e.g., a height of the host vehicle 101, the computer 105 can determine that the target vehicle 200 is at an elevation that is not likely to collide with the host vehicle 101, and the computer 105 can suppress a collision avoidance action for the target vehicle 200. That is, the computer 105 can compare the elevation of the target vehicle 200 to an elevation threshold. The elevation threshold can be a vertical distance above which the target vehicle 200 would not collide with the host vehicle 101 even if the host vehicle 101 and the target vehicle 200 were at the same lateral and longitudinal position. The elevation threshold can be twice the height of a typical vehicle 101, e.g., 3 meters. If the elevation of the target vehicle 200 differs from the elevation of the host vehicle 101 by more than the elevation threshold, the computer 105 can determine that the target vehicle 200 is not likely to collide with the host vehicle 101 and suppress the collision avoidance action. Alternatively, the host vehicle 101 can receive the elevation of the target vehicle 200 from the message from the target vehicle 200.

In another example, the computer 105 can actuate the camera 110 to collect image data 115 of an environment around the target vehicle 200 and, using a conventional image recognition technique, identify an overpass or bridge on which the target vehicle 200 is traveling and below which the host vehicle 101 will travel. That is, if the target vehicle 200 is on infrastructure above the roadway on which the host vehicle 101 is traveling (e.g., an overpass, a bridge, etc.), the computer 105 can determine that the target vehicle 200 is at an elevation that is not likely to collide with the host vehicle 101, and the computer 105 can suppress a collision avoidance action for the target vehicle 200.

In yet another example, the host vehicle 101 can identify global position coordinates of the target vehicle 200 and compare the coordinates to a high-resolution map that includes features such as an overpass and a bridge. If the high-resolution map indicates that the target vehicle 200 is on infrastructure above the host vehicle 101, the computer 105 can determine that target vehicle 200 is at an elevation that is not likely to collide with the host vehicle 101, and the computer 105 can suppress a collision avoidance action for the target vehicle 200. Alternatively, if the computer 105 determines that the elevation of the target vehicle 200 is below the host vehicle 101 by the threshold (e.g., with image data 115 as described above), the computer 105 can determine that target vehicle 200 is at an elevation that is not likely to collide with the host vehicle 101, and the computer 105 can suppress a collision avoidance action for the target vehicle 200.

The computer 105 can arbitrate the message from the first target vehicle 200 and the data 115 about the second target vehicle 300. In this context, to "arbitrate" is to collect more than one set of data 115 and to perform a collision avoidance action according to one of the sets of data 115 and to suppress collision avoidance actions according to the other set of data 115, i.e., to select to use a first set of data and not a second set of data. The computer 105 can arbitrate the collision avoidance action directed toward the first target vehicle 200 and a second collision avoidance action directed toward the second target vehicle 300 based on an order of receipt of the message and the data 115. That is, if the computer 105 receives the message form the first target vehicle 200 before collecting data 115 about the second target vehicle 300, the computer 105 can perform the collision avoidance action to avoid and/or mitigate a collision with the first target vehicle 200 and suppress the second collision avoidance action. If the computer 105 collects the data 115 about the second target vehicle 300 before receiving the message from the first target vehicle 200, the computer 105 can perform the second collision avoidance action to avoid and/or mitigate a collision with the second target vehicle 300 and suppress the collision avoidance action.

Figure 6A:
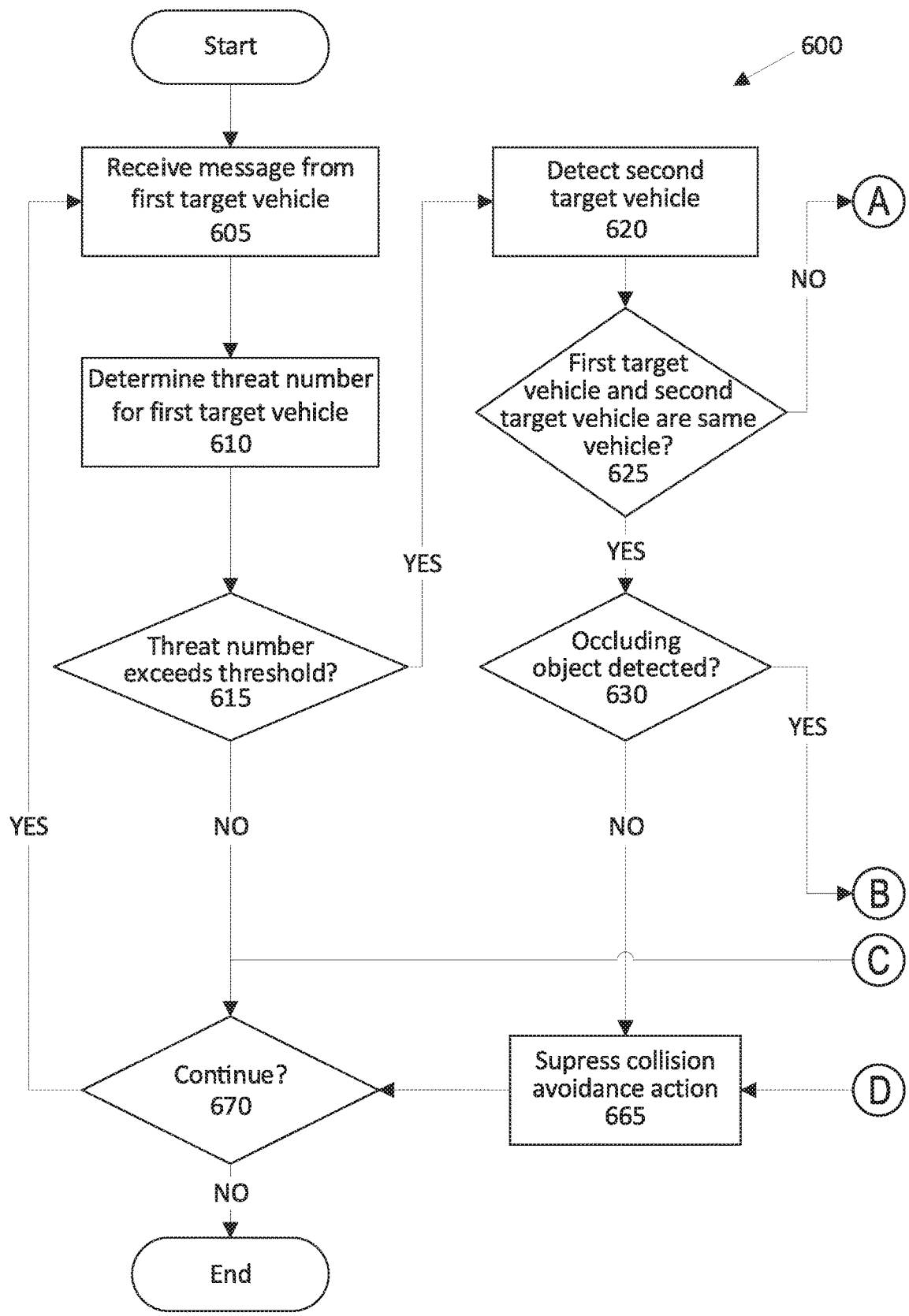
FIGS. 6A-6B are a block diagram of an example process for collision avoidance and mitigation.
Figure 6B:
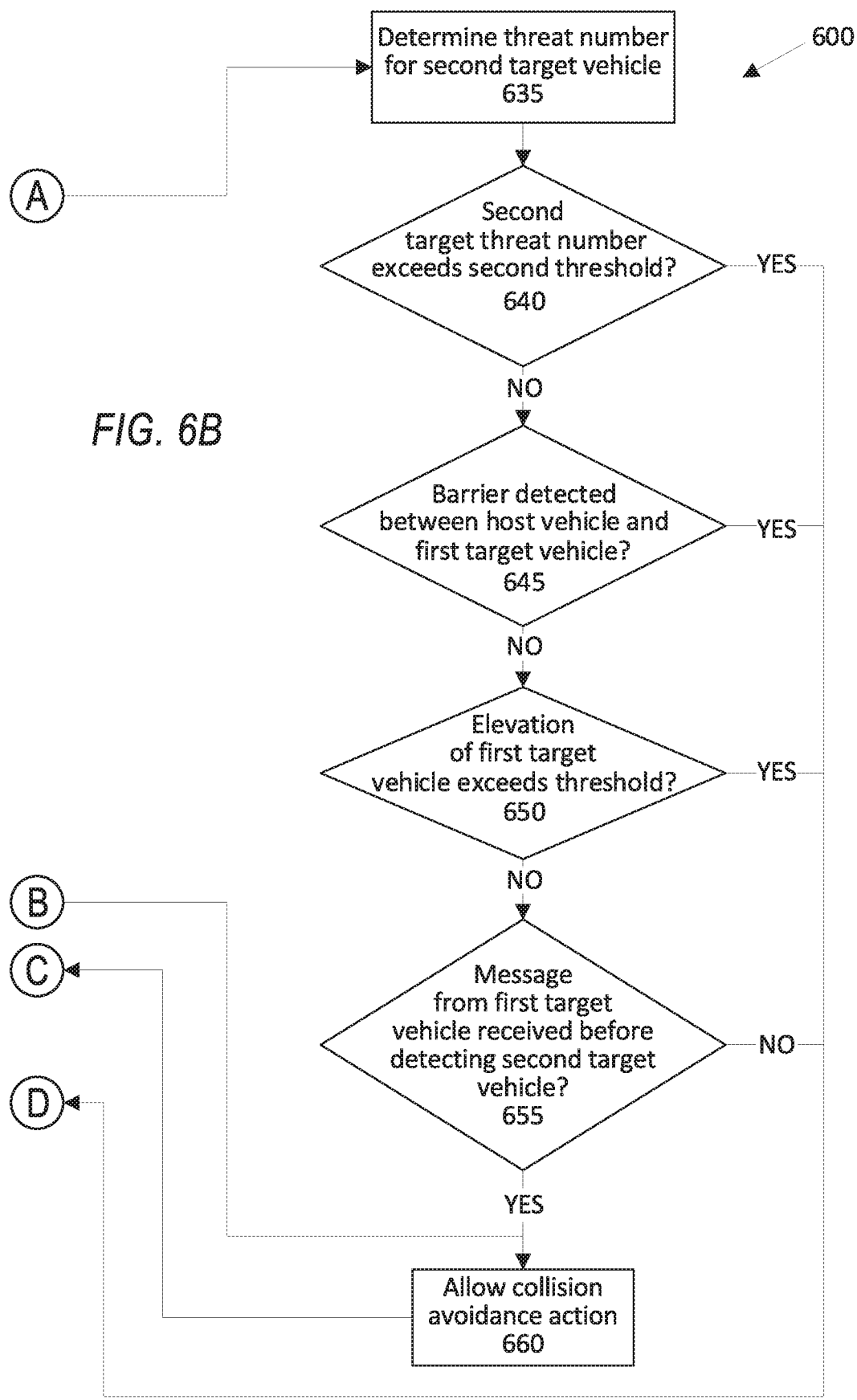

FIGS. 6A-6B are a block diagram of an example process 600 for collision mitigation and avoidance. The process 600 begins in a block 605, in which a computer 105 of a host vehicle 101 receives a message from a first target vehicle 200. As described above, the message from the first target vehicle 200 can include data 115 about the first target vehicle 200, e.g., speed, position, route history, etc.

Next, in a block 605, the computer 105 determines a threat number for the first target vehicle 200. As described above, the computer 105 can use the data 115 of the message to determine a threat number TN of the first target vehicle 200 that is a prediction of whether a specific target 200 will intersect or collide with the host vehicle 101. For example, the computer 105 can determine a brake threat number BTN, a steering threat number STN, and/or an acceleration threat number ATN.

Next, in a block 615, the computer 105 determines whether the threat number of the first target vehicle 200 exceeds a threat number threshold. As described above, the threat number threshold can be a value determined based a likelihood of a collision between the host vehicle 101 and the first target vehicle 200. If the threat number of the first target vehicle 200 exceeds the threat number threshold, the process 600 continues in a block 620. Otherwise, the process 600 continues in a block 670.

In the block 620, the computer 105 actuates one or more sensors 110 to detect a second target vehicle 300. As described above, the computer 105 can collect data 115 with the sensors 110 of nearby vehicles 300. For example, the computer 105 can collect image data 115 with a camera 110 and detect the second target vehicle 300 with a conventional image-recognition algorithm, e.g., Canny edge detection.

Next, in a block 625, the computer 105 determines whether the first target vehicle 200 and the second target vehicle 300 are a same vehicle. As described above, the computer 105 can compare at least one of speed, position, and/or route history data 115 received from the first target vehicle 200 and detected for the second target vehicle 300 to determine whether the first target vehicle 200 and the second target vehicle 300 are the same vehicle. That is, the computer 105 determines whether the vehicle that sent the message over the network 125 is the same vehicle as the vehicle detected by the sensors 110. If the speed, position, and/or route history data 115 are within respective thresholds, as described above, the computer 105 can determine that the first target vehicle 200 and the second target vehicle 300 are the same vehicle. If the first target vehicle 200 and the second target vehicle 300 are the same vehicle, the process 600 continues in a block 630. Otherwise, the process 600 continues in a block 635. Alternatively, the process 600 can proceed to the block 630 when the computer 105 detect no second target vehicle 300, i.e., the computer 105 does not detect any vehicles that could have sent the message.

In the block 630, the computer 105 determines whether there is an object 205 occluding the first target vehicle 200 from the host vehicle 101. As described above, the computer 105 can actuate one or more sensors 110 to detect the first target vehicle 200. The computer 105 may not detect the first target vehicle 200 if an object 205 occludes the first target vehicle 200. The object 205 can block the sensors 110 from collecting data 115, e.g., blocking a field of vision of an image sensor 110, reflecting ultrasonic waves and/or radar waves, blocking lasers of a LIDAR 110, etc.

If the computer 105 detects an occluding object 205, the process 600 continues in a block 660. Otherwise, the process 600 continues in a block 665.

In the block 635, the computer 105 determines a threat number TN for the second target vehicle 300. As described above, the computer 105 can determine the threat number TN based on the data 115 collected about the second target vehicle 300 from the sensors 110. The threat number TN can be, e.g., a brake threat number BTN, a steering threat number STN, an acceleration threat number ATN, etc.

Next, in a block 640, the computer 105 determines whether the threat number TN for the second target vehicle 300 exceeds a second threat number threshold. As described above, the second threat number threshold can be a value determined based a likelihood of a collision between the host vehicle 101 and the second target vehicle 300. The second threat number threshold can differ from the threat number threshold for the first target vehicle 200. For example, the second target vehicle 300 may be closer to the host vehicle 101 than the first target vehicle 200 and the operator of the host vehicle 101 may see the second target vehicle 300 and perform collision mitigation and avoidance. Thus, because the operator may see the second target vehicle 300, the second threat number threshold may be higher than the threat number threshold. Alternatively, the second threat number threshold can be the same as the threat number threshold. If the second threat number exceeds the second threat number threshold, the process 600 continues in the block 665. Otherwise, the process 600 continues in a block 645.

In the block 645, the computer 105 determines whether there is a barrier 400 detected between the host vehicle 101 and the first target vehicle 200. As described above, when there is a barrier 400 between the host vehicle 101 and the first target vehicle 200 (e.g., a concrete wall separating two roadway lanes), the first target vehicle 200 is not likely to collide with the host vehicle 101. The computer 105 can detect the barrier 400 based on data 115 collected with one or more sensors 110. For example, the computer 105 can collect a plurality of images and, using a conventional image-recognition technique, e.g., Canny edge detection, can determine whether the images indicate that there is a barrier 400 between the host vehicle 101 and the first target vehicle 200. If the computer 105 detects a barrier 400 between the host vehicle 101 and the first target vehicle 200, the process 600 continues in the block 665. Otherwise, the process 600 continues in a block 650.

In the block 650, the computer 105 determines whether the elevation of the first target vehicle 200 exceeds an elevation threshold. As described above, if the elevation of the first target vehicle 200 is higher or lower than the host vehicle 101, the first target vehicle 200 may not be likely to collide with the host vehicle 101. For example, if the first target vehicle 200 is on an overpass above the host vehicle 101, the first target vehicle 200 is not likely to collide with the host vehicle 101. If the elevation of the first target vehicle 200 exceeds the elevation threshold, the process 600 continues in the block 665. Otherwise, the process 600 continues in a block 655.

In the block 655, the computer 105 arbitrates the message from the first target vehicle 200 and the data 115 collected about the second target vehicle 300 to determine which of the message and the data 115 were received first. That is, if the computer 105 receives the message from the first target vehicle 200 before collecting data 115 about the second target vehicle 300, the computer 105 can perform a collision avoidance action for the first target vehicle 200. If the computer 105 determines that the message from the first target vehicle 200 was received first, the process 600 continues in a block 660. Otherwise, the process 600 continues in the block 665.

In the block 660, the computer 105 allows the collision avoidance action in accordance with the message from the first target vehicle 200. That is, the computer 105 performs the collision avoidance action based on the data in the message from the first target vehicle 200. For example, the computer 105 can provide a forward collision warning on an HMI in an interior of the host vehicle 101. In another example, the computer 105 can actuate a brake to slow the host vehicle 101 to allow the first target vehicle 200 to pass the host vehicle 101.

In the block 665, the computer 105 suppresses the collision avoidance action. As described above, because the first target vehicle 200 is not likely to collide with the host vehicle 101, the computer 105 suppresses actions typically performed to mitigate and/or avoid the collision. For example, the computer 105 can suppress a forward collision warning from appearing on the HMI.

In the block 670, the computer 105 determines whether to continue the process 600. For example, the computer 105 can determine to continue the process 600 upon receiving another message from a target vehicle 200. If the computer 105 determines to continue, the process 600 returns to the block 605. Otherwise, the process 600 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and the server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 600, one or more of the steps could be omitted, or the steps could be executed in a different order than shown in FIGS. 6A-6B. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to, in a host vehicle:
   determine a threat number for a first target vehicle based on data received from the first target vehicle indicating at least one of a position, speed, or route history of the first target vehicle;
   identify a second target vehicle based on data collected with one or more host vehicle sensors in response to determining that the threat number of the first target vehicle exceeds a threshold;
   determine that the first target vehicle and the second target vehicle are not a same vehicle; and
   then, upon determining that the first target vehicle and the second target vehicle are not the same vehicle and that at least one of (a) a barrier is detected between the host vehicle and the first target vehicle or (b) that a threat number of the second target vehicle exceeds a second threshold, suppress a collision avoidance action.

2. The system of claim 1, wherein the instructions further include instructions to determine that the first target vehicle and the second target vehicle are not the same vehicle when data from the sensors indicating at least one of a size, position, and speed differs from corresponding received data by a threshold.

3. The system of claim 1, wherein the instructions further include instructions to suppress the collision avoidance action upon determining that a difference between a vertical position of the first target vehicle and a vertical position of the host vehicle exceeds a threshold.

4. The system of claim 1, wherein the instructions further include instructions to suppress the collision avoidance action upon determining that the first target vehicle is on a bridge above the host vehicle.

5. The system of claim 1, wherein the instructions further include instructions to allow the collision avoidance action upon failing to detect the second target vehicle with the vehicle sensors.

6. The system of claim 1, wherein the instructions further include instructions to allow the collision avoidance action upon determining that the threat number of the second target vehicle is below a second threshold.

7. The system of claim 1, wherein the instructions further include instructions to arbitrate the collision avoidance action and a second collision avoidance action, the second collision avoidance action directed toward the second target vehicle, based on a receipt order of the received data from the first target vehicle and the sensor data identifying the second target vehicle.

8. The system of claim 1, wherein the instructions further include instructions to suppress the collision avoidance action upon identifying that the first target vehicle and the second target vehicle are the same vehicle and detecting no occluding object between host vehicle and the first target vehicle.

9. The system of claim 8, wherein the instructions further include instructions to allow the collision avoidance action upon identifying an occluding object between the host vehicle and the first target vehicle.

10. The system of claim 1, wherein the instructions further include instructions to suppress the collision avoidance action upon determining that the second target vehicle is closer to the host vehicle than the first target vehicle.

11. A method, comprising:
    determining a threat number for a first target vehicle based on data received from the first target vehicle indicating at least one of a position, speed, or route history of the first target vehicle;
    identifying a second target vehicle based on data collected with one or more host vehicle sensors in response to determining that the threat number of the first target vehicle exceeds a threshold;
    determining that the first target vehicle and the second target vehicle are not a same vehicle; and
    then, upon determining that the first target vehicle and the second target vehicle are not the same vehicle and that at least one of (a) a barrier is detected between a host vehicle and the first target vehicle or (b) that a threat number of the second target vehicle exceeds a second threshold, suppressing a collision avoidance action.

12. The method of claim 11, further comprising determining that the first target vehicle and the second target vehicle are not the same vehicle when data from the sensors indicating at least one of a size, position, and speed differs from corresponding received data by a threshold.

13. The method of claim 11, further comprising allowing the collision avoidance action upon determining that the threat number of the second target vehicle is below the second threshold.

14. The method of claim 11, further comprising arbitrating the collision avoidance action and a second collision avoidance action, the second collision avoidance action directed toward the second target vehicle, based on a receipt order of the received data from the first target vehicle and the sensor data identifying the second target vehicle.

15. The method of claim 11, further comprising suppressing the collision avoidance action upon identifying that the first target vehicle and the second target vehicle are the same vehicle and detecting no occluding object between host vehicle and the first target vehicle.

16. A system, comprising:
    a host vehicle sensor;
    means for determining a threat number for a first target vehicle based on data received from the first target vehicle indicating at least one of a position, speed, or route history of the first target vehicle;
    means for identifying a second target vehicle based on data collected with the host vehicle sensor in response to determining that the threat number of the first target vehicle exceeds a threshold;
    means for determining that the first target vehicle and the second target vehicle are not a same vehicle; and
    means for suppressing a collision avoidance action upon determining that the first target vehicle and the second target vehicle are not the same vehicle and that at least one of (a) a barrier is detected between a host vehicle and the first target vehicle or (b) that a threat number of the second target vehicle exceeds a second threshold.

17. The system of claim 16, further comprising means for determining that the first target vehicle and the second target vehicle are not the same vehicle when data from the sensors indicating at least one of a size, position, and speed differs from corresponding received data by a threshold.

18. The system of claim 16, further comprising means for allowing the collision avoidance action upon determining that the threat number of the second target vehicle is below the second threshold.

19. The system of claim 16, further comprising means for arbitrating the collision avoidance action and a second collision avoidance action, the second collision avoidance action directed toward the second target vehicle, based on a receipt order of the received data from the first target vehicle and the sensor data identifying the second target vehicle.

20. The system of claim 16, further comprising means for suppressing the collision avoidance action upon identifying that the first target vehicle and the second target vehicle are the same vehicle and detecting no occluding object between host vehicle and the first target vehicle.

\* \* \* \* \*